United States Patent [19]

Kiya

[11] Patent Number: 4,753,588
[45] Date of Patent: Jun. 28, 1988

[54] VELOCITY CONTROL SYSTEM OF INJECTION MOLDING MACHINE INJECTION SHAFT

[75] Inventor: Nobuyuki Kiya, Hachioji, Japan

[73] Assignee: Fanuc Ltd, Yamanashi, Japan

[21] Appl. No.: 862,228

[22] PCT Filed: Sep. 4, 1985

[86] PCT No.: PCT/JP85/00497
§ 371 Date: Apr. 29, 1986
§ 102(e) Date: Apr. 29, 1986

[87] PCT Pub. No.: WO86/01455
PCT Pub. Date: Mar. 13, 1986

[30] Foreign Application Priority Data

Sep. 4, 1984 [JP] Japan ................ 59-185050

[51] Int. Cl.⁴ .................... B29C 45/77; B29C 45/80
[52] U.S. Cl. ...................... 425/145; 264/40.7; 425/171
[58] Field of Search .......... 425/143, 144, 145, 149, 425/150, 169, 170, 171; 264/40.7

[56] References Cited

U.S. PATENT DOCUMENTS

| | | | |
|---|---|---|---|
| 3,721,512 | 3/1973 | Ma et al. | 425/149 |
| 3,767,339 | 10/1973 | Hunkar | 425/145 |
| 4,222,725 | 9/1980 | Rodgers, Jr. | 425/145 |

FOREIGN PATENT DOCUMENTS 121037  9/1980  Japan .
2119307 11/1983  United Kingdom .

Primary Examiner—Jay H. Woo
Assistant Examiner—Timothy W. Heitbrink
Attorney, Agent, or Firm—Staas & Halsey

[57] ABSTRACT

A velocity control system for the injection shaft of an injection molding machine is adapted to drive an injection shaft (2″) by an electric motor (20) and to control the electric motor (20) by a numerical control unit (30). The final position of the injection shaft (2″) and the reference velocity of the injection shaft are commanded by data of a single block, and the velocity of the injection shaft (2″) at each commanded position is obtained by correcting the reference velocity by means of a feedrate override value using an override table. Accordingly, an instruction of a single block suffices as an instruction for a single injection operation, thus simplifying CNC data processing.

1 Claim, 3 Drawing Sheets

| POSITION | VELOCITY |
|---|---|
| $P_1$ | $f_1/f \times 100$ |
| $P_2$ | $f_2/f \times 100$ |
| . | . |
| . | . |
| . | . |
| $P_6$ | $f_6/f \times 100$ |

VELOCITY CONTROL SYSTEM OF INJECTION MOLDING MACHINE INJECTION SHAFT

TECHNICAL FIELD

This invention relates to a system for controlling the velocity of an injection shaft of an injection molding machine. More particularly, the invention relates to a velocity control system of an injection molding machine injection screw adapted to enable smooth and accurate control by using a numerical control unit (NC unit).

BACKGROUND ART

In the working of plastics, particularly most thermoplastic elastomers such as vinyl chloride resin, it is strongly desired that productivity be improved by reducing the energy needed for such working and that a uniform product quality be obtained. Accordingly, in recent years such devices as injection molding machines having a control unit incorporating a computer for accurate machining control have been put into practical use. FIG. 4 is a view showing the control system arrangement of an injection molding machine employed in the prior art. This conventional injection molding machine control system will now be described with reference to FIG. 4. In FIG. 4, numeral 1 denotes a hopper for holding chips of a thermoplastic elastomer such as vinyl chloride, and numeral 2 designates a screw for feeding the chips contained in the hopper 1 in the direction of a cylinder 2'. Owing to rotation of the screw, the chips are fed to the cylinder 2' and are melted by the application of heat. The molten material, which is supplied to and fills the cylinder 2' and a nozzle 3, is injected into a mold 4 by movement of the screw 2 in the direction of the nozzle 3. Numeral 5 denotes a hydraulic motor for rotatively driving the screw 2, 6 a flowrate control valve for regulating the amount of oil supplied to the hydraulic motor 5, 7 a hydraulic cylinder for controlling back-and-forth movement of an injection shaft 2'' (a shaft for moving the screw back and forth) inside the cylinder 2', and a 8 servo valve for controlling hydraulic pressure fed to the hydraulic cylinder 7. Numeral 9 denotes a tachogenerator for sensing the rotational speed of the screw 3 and for applying a screw rotation signal to a process control unit 15, described below. Numeral 11 represents an absolute encoder for sensing the axial position of the screw 2 and for producing a screw position signal applied to the process control unit 15. Numeral 12 designates a pressure sensor for sensing hydraulic chamber pressure of the hydraulic cylinder 7 and for producing injection pressure and back pressure signals applied to the process control unit 15. Numeral 13 denotes a cavity pressure sensor for sensing the pressure in a cavity of the mold 4 and for producing a detection signal applied to the process control unit 15.

The process control unit 15 has an internal computer, executes processing on the basis of input signals from each of the abovementioned sensors and from temperature sensors provided on the mold 4 and heating cylinder, and outputs a servo valve control signal, flowrate control signal and temperature control signal.

In the conventional injection molding machine control system constructed as set forth above, the servo valve 8 is operated on the basis of the flowrate control signal and servo valve control signal produced by the process control unit 15 after the mold 4 is clamped and set, and the screw 2 is moved in the direction of the nozzle 3 so that the molten material filling the interior of the cylinder 2' is injected into the mold 4 from the nozzle 3. When the molten material is thus injected, the process control unit 15 executes control for dwell over a predetermined period of time, subsequently executes cooling control, retracts the screw 2 by operating the hydraulic cylinder 7 and effects control for unclamping the mold. After the workpiece molded by the mold is extracted, the mold 4 is reclamped, the hydraulic motor 5 is driven to rotate the screw, and the chips in the hopper 1 are fed into the cylinder 2' and melted. Thereafter, the injection operation is performed as described above to mold workpieces one after another.

In the conventional injection molding machine control system, the screw 2 is operated by the hydraulic motor 5 and hydraulic cylinder 7, so that control is implemented hydraulically. However, a hydraulic control system has a slow control response and a complicated mechanism and is troublesome in terms of maintenance.

A system has recently been proposed in which rotation and movement of the injection molding machine screw are performed by electric motors and primary control is implemented by a computer.

However, various problems are encountered in control when the screw and injection shaft of the injection molding machine are driven by electric motors.

For example, when the screw is moved in the direction of the mold by controlling the injection shaft of an injection molding machine to inject the raw material into the mold, it is required that the traveling velocity of the injection shaft be changed at discrete positions of the injection shaft. FIG. 3 is a view for describing this change in velocity. In the Figure, the horizontal axis shows positions of the injection shaft. More specifically, P0 through P6 indicate discrete positions of the injection shaft. The vertical axis shows the velocity of the injection shaft, with f1 through f6 indicating velocities of the injection shaft at the respective positions.

In a case where a numerical control unit is employed as the process control unit 15 to perform velocity control at the predetermined positions P0–P6 of the injection shaft 2'' through the conventional NC format, namely $$G01 \times P1 \, F f1;$$
$$G01 \times P2 \, F f2;$$
$$\vdots$$
$$G01 \times P6 \, F f6;$$

NC commands are executed one block at a time whenever the position and speed change. As a result, there are instances where the operation of the numerical control unit cannot follow up the change in these instructions. If rough commands that enable the operation of the numerical control unit to follow up are used, however, then accurate control of the injection molding machine cannot be executed.

The present invention has been devised to solve the aforementioned problem and its object is to provide an economical velocity control system of an injection molding machine in which use is made of an NC unit capable of controlling the velocity of the injection shaft smoothly and accurately.

DISCLOSURE OF THE INVENTION

According to the present invention, there is provided a velocity control system of an injection molding machine injection screw in which raw material chips in a hopper are fed into a cylinder by a screw rotated by an electric motor and the raw material inside the cylinder is injected into a mold by movement of the screw. The system includes an injection shaft having a screw, means for commanding, by a single block, a final operating position of the injection shaft and a reference velocity at the time of an injection operation, means for moving the injection shaft longitudinally inside the cylinder, means for storing an override value stipulating a traveling velocity of the injection shaft corresponding to the position of the injection shaft when the injection shaft is moved by an instruction of the commanding means, and control means for effecting movement upon correcting the reference velocity of the injection shaft by an override value corresponding to a predetermined commanded position of the injection shaft when the injection shaft is moved inside the cylinder by the moving means.

The velocity control system of the injection molding machine according to the present invention is so adapted that a numerical control unit controlling an electric motor for driving the injection shaft commands the final position of the injection shaft and the reference velocity of the injection shaft by a single block, and obtains a velocity at each position of the injection shaft by applying a feedrate override to the electric motor by using an override table. Accordingly, data processing internally of the numerical control unit is simplified and multi-stage velocity control of the injection shaft is executed smoothly and accurately.

BEST MODE FOR CARRYING OUT THE INVENTION

Figure 1:
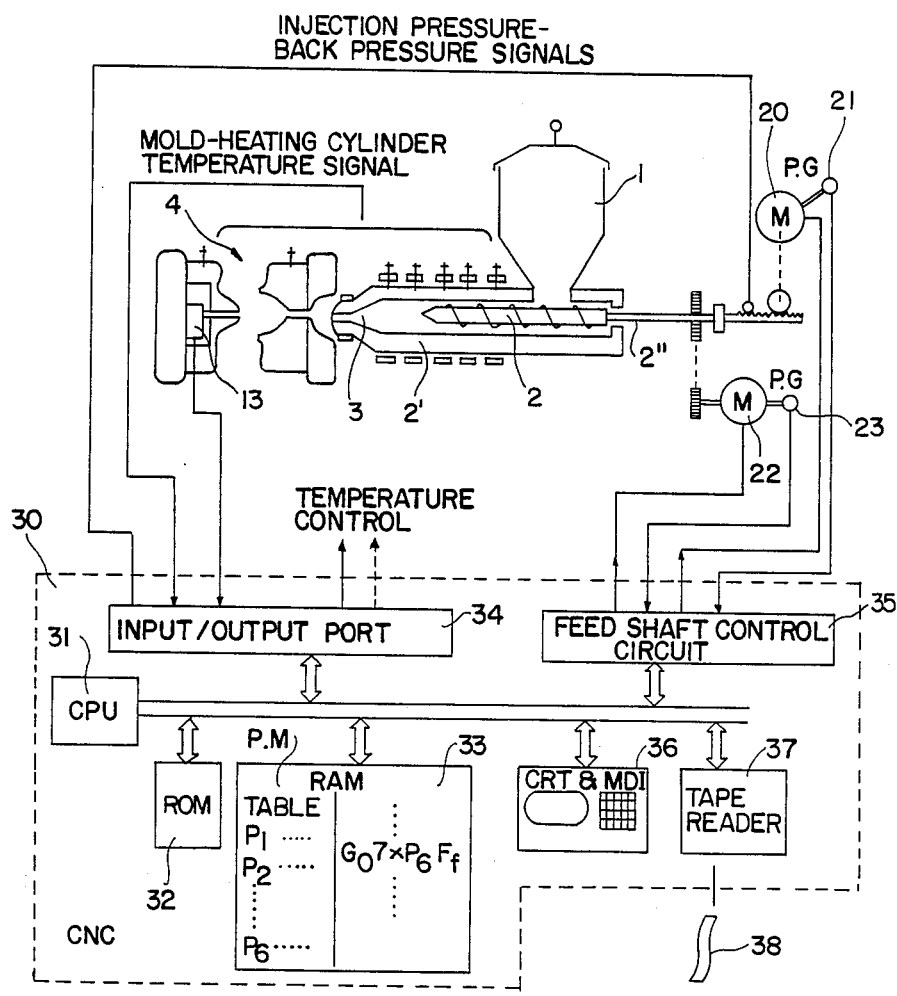
FIG. 1 is a view showing the construction of an injection molding machine control system embodying the present invention.

The present invention will be described on the basis of an embodiment illustrated in the drawings.

Figure 4:
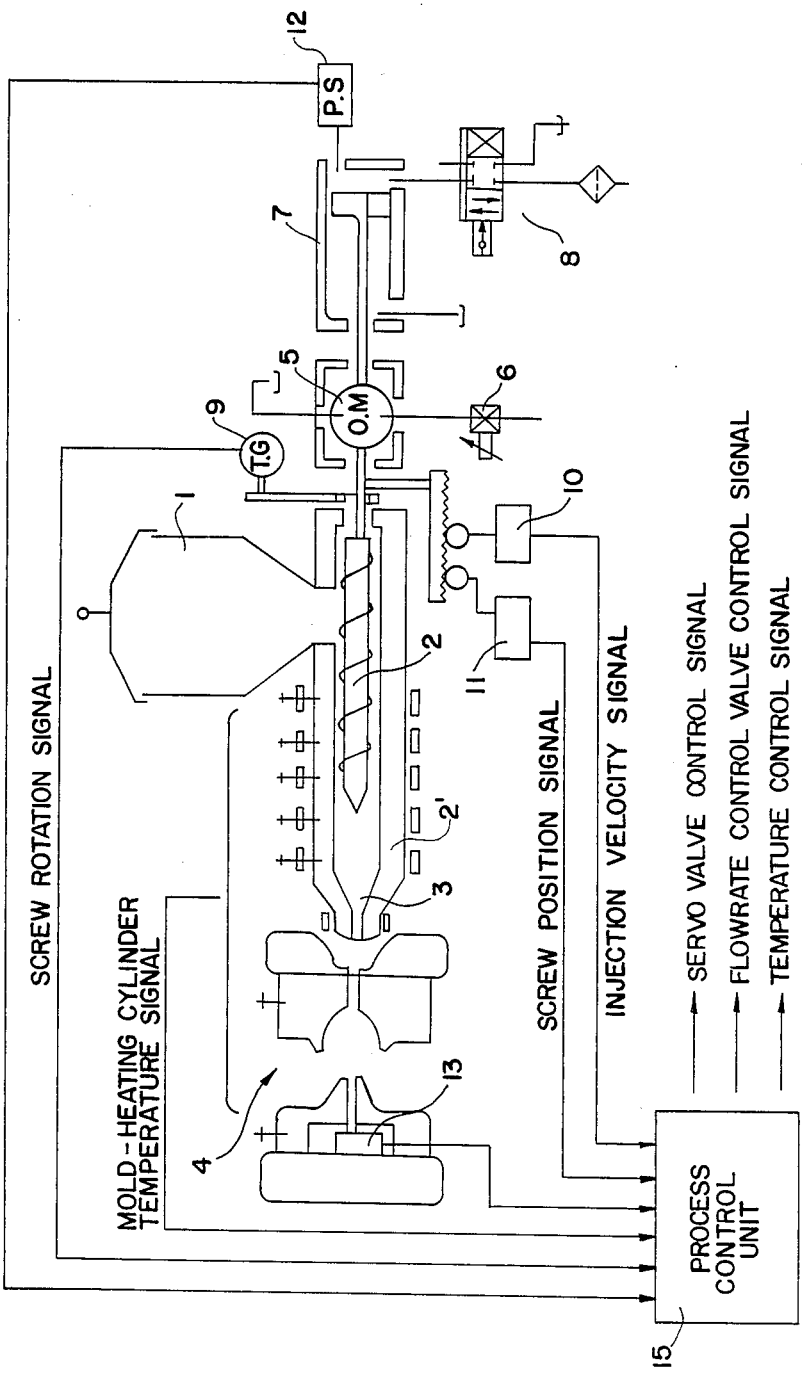
FIG. 4 is a view showing the construction of a conventional injection molding machine control system.

FIG. 1 is a view showing the construction of an injection molding machine control system embodying the present invention. Portions similar to those shown in FIG. 4 are designated by like reference characters and a detailed description thereof is deleted. In the Figure, numeral 20 denotes an electric motor for driving the injection shaft (which is a shaft for moving the screw back and forth). Though not shown, the motor has a well-known torque limit function. Numeral 21 denotes a pulse generator for providing information indicative of rotation of the motor and for producing a detection signal applied to a feed shaft control circuit 35, described below. Numeral 22 denotes an electric motor for screw rotation which, and numeral 23 designates a pulse generator for providing motor rotational position and velocity signals, which are applied to the feed shaft control circuit 35. Numeral 30 represents a numerical control unit (CNC unit) having an internal computer and including a processor (CPU) 31 for executing processing based on a control program, a read-only memory (ROM) 32 storing the control program, a random-access memory (RAM) 33 for storing the results of processing performed by the CPU 31 as well as various data, an input/output port 34, the feed shaft control circuit 35, an operator's panel 36 having a display, and a tape reader 37. Further, numeral 38 denotes an NC tape bearing machining commands in punched form.

The operation of the injection molding machine control system of the illustrated embodiment arranged as set forth above will now be described.

The electric motor 20 for driving the injection shaft in the longitudinal direction and the electric motor 22 for rotatively driving the screw 2 are controlled by the CNC unit 30. Specifically, when the screw 2 is moved backward at the time that the molten raw material is injected into the mold from the nozzle 3, the CNC unit 30 receives information indicative of rotation of the electric motor 20, which is sensed by the pulse generator 21, via the feed shaft control circuit 35, performs predetermined processing and subjects the electric motor to feedback control. Further, when the raw material in the hopper 1 is fed into the cylinder 2', the CNC unit 30 receives information indicative of rotation of the electric motor 22, which is sensed by the pulse generator 23, via the feed shaft control circuit 35, compares the rotation information with a commanded value and executes control in such a manner that the electric motor 22 will rotate in a predetermined manner. The CNC unit 30 receives a variety of control information from various portions of the injection molding machine and executes predetermined processing to control temperature as well as injection and back pressure.

A specific example of velocity control of the injection molding machine injection shaft 2" will now be described.

Figures 2, 3:
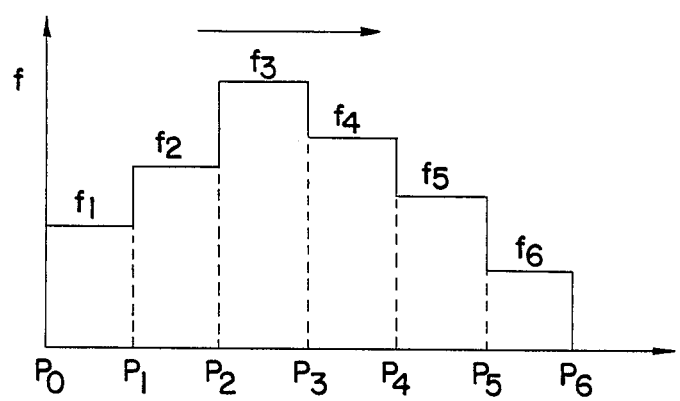
FIG. 2 is a view for describing an override table.
FIG. 3 is a view for describing velocity control of the injection shaft of an injection molding machine.

When the raw material is injected into the mold 4 from the nozzle 3 in the injection molding machine as illustrated in FIG. 3, control is executed for moving the injection shaft 2" in the direction of the nozzle 3. In order to accomplish this, however, it is necessary to change the velocity of the injection shaft at individual positions.

Accordingly, in the present invention, a command for operating the injection shaft 2" in a single injection operation is executed solely by an NC command of one block. When the injection shaft 2" is in the course of being moved, velocity control thereof is executed by utilizing an override function of the CNC unit. More specifically, the CNC unit 30 provides a G-code G07 for velocity control as a code when the raw material is injected, the command issued being as follows:

G07×P6 Ff

In the above, P6 indicates the position of an end point to which the injection shaft 2" is moved, and Ff represents a reference velocity of the injection shaft.

According to the present invention, velocity commands at discrete points to the which the injection shaft 2" is moved are stored as an override table in a parameter area PM of the RAM 33 in the CNC unit 30. Whenever a commanded position for operating the injection shaft 2" reaches one of the points P1 through P6, the override table is looked up and an override position for each and every position of the injection shaft 2" is taken from the table and serves as velocity information of the injection shaft 2''.

FIG. 2 is a view for describing the override table, in which override values are arranged to correspond to the positions P1 through P6. In dependence upon distribution quantities (P1, P2, ... P6) according to the distribution of G07, the CNC unit 30 applies a feedrate override corresponding thereto, thereby making velocity control possible. In particular, override has recently come to be expressed in units of 0.01% rather than 10% and, therefore, is more precise. By applying a correction to a feedrate override system based on an already existing external signal, especially an external signal using an override switch, there can be obtained a CNC-based velocity control system for the injection shaft of the above-described injection molding machine, enabling the velocity of the injection shaft to be controlled smoothly and accurately.

Thus, the system of the present invention has the electric motor 20 for driving the injection shaft 2'', and the numerical control unit 30 for controlling the electric motor 20. The numerical control unit 30 commands the final position of the injection shaft 2'' and the reference velocity of the injection shaft by a single block, and obtains a velocity at each position of the injection shaft by applying a feedrate override to the electric motor by using a feedrate override table, thus effecting velocity control of the injection shaft of the injection molding machine. As a result, fine velocity control can be performed after the injection operation, and injection of the raw material can be executed in an accurate manner. Rather than relying upon a velocity control system for the injection shaft of an injection molding machine based on conventional fluidic control, the present invention adopts a novel velocity control system incorporating a CNC unit. The present invention has outstanding effects and will be of great use in future technological development.

Though the present invention has been described based on the illustrated embodiment, the invention is not limited to this embodiment but can be modified in various ways in accordance with the gist of the present invention, such modifications being within the scope of the invention.

Industrial Applicability

Thus, the present invention is arranged to drive the injection shaft of an injection molding machine by an electric motor. The final position of the injection shaft and the reference velocity of the injection shaft are commanded by a single block, and a velocity is obtained at each position of the injection shaft by applying a feedrate override to the electric motor by using an override table. Accordingly, the invention is particularly well-suited for application to velocity control of the injection shaft of an injection molding machine performed by a numerical control unit.

I claim:

1. A numerically velocity control system controlled for an injection molding machine injection shaft in which raw material chips in a hopper are fed into a cylinder by a screw rotated by an electric motor and the raw material inside the cylinder is injected into a mold by movement of the screw, the system comprising:

an injection shaft having a screw;

means for commanding, by a single block, a final operating position of the injection shaft and a reference velocity at the time of an injection operation;

electric motor means for moving the injection shaft longitudinally inside the cylinder;

means for storing an override value stipulating a traveling velocity of the injection shaft corresponding to a position of the injection shaft when the injection shaft is moved by an instruction of said commanding means; and control means for reading an override value corresponding to a predeterimined commanded position of the injection shaft out of the storage means when the injection shaft is moved inside the cylinder by the moving means, and for effecting movement upon correcting the reference velocity of the injection shaft by the override value.

* * * * *

UNITED STATES PATENT AND TRADEMARK OFFICE
CERTIFICATE OF CORRECTION

PATENT NO. : 4,753,588

DATED : June 28, 1988

INVENTOR(S) : Nobuyuki Kiya

It is certified that error appears in the above-identified patent and that said Letters Patent is hereby corrected as shown below:

Col. 6, line 18, after "numerically" insert --controlled--, after "system" delete --controlled--.

Signed and Sealed this

Twenty-seventh Day of September, 1988

Attest:

DONALD J. QUIGG

Attesting Officer

Commissioner of Patents and Trademarks